J. L. WHITNEY.
HEMOGLOBINOMETER.
APPLICATION FILED JUNE 19, 1914.
1,143,675.
Patented June 22, 1915.
2 SHEETS—SHEET 1.
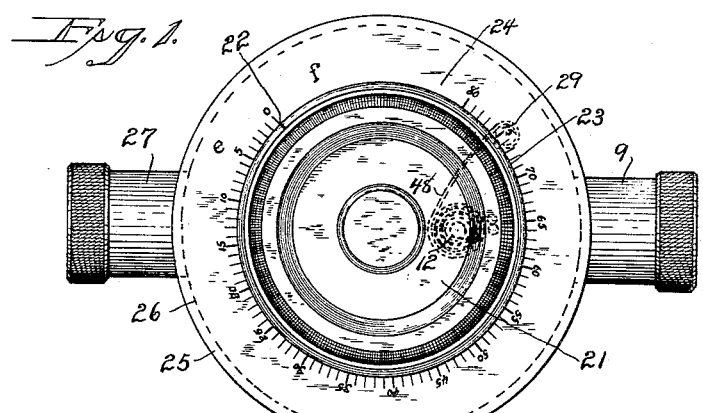
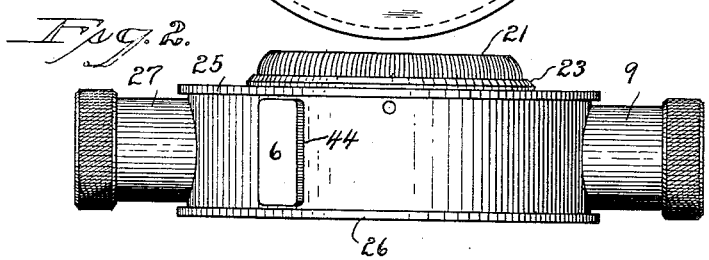
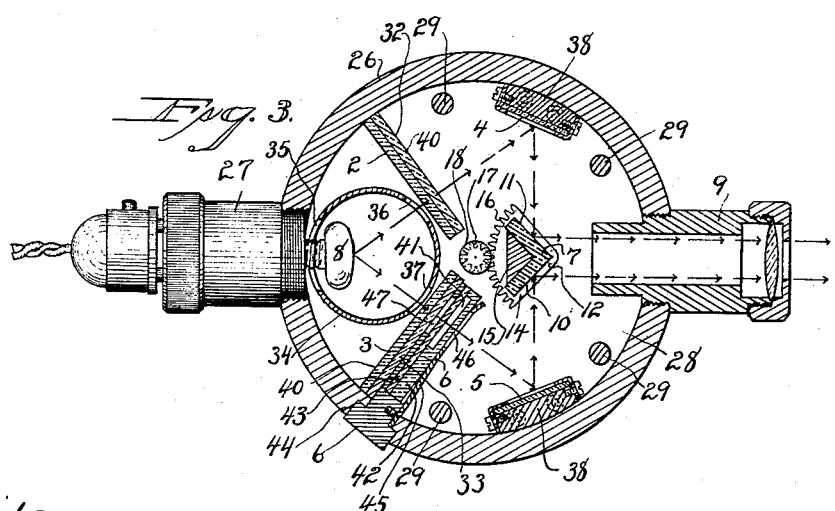

J. L. WHITNEY.
HEMOGLOBINOMETER.
APPLICATION FILED JUNE 19, 1914.

1,143,675.

Patented June 22, 1915.
2 SHEETS—SHEET 2.

UNITED STATES PATENT OFFICE.

JAMES L. WHITNEY, OF SAN FRANCISCO, CALIFORNIA.

HEMOGLOBINOMETER.

1,143,675.   Specification of Letters Patent.   Patented June 22, 1915.

Application filed June 19, 1914. Serial No. 846,053.

*To all whom it may concern:*

Be it known that I, JAMES L. WHITNEY, a citizen of the United States, residing at San Francisco, in the county of San Francisco and State of California, have invented a new and useful Improvement in Hemoglobinometers; and I do hereby declare the following, when taken in connection with the accompanying drawings and the characters of reference marked thereon, to be a full, clear, and exact description of the same, and which said drawings constitute part of this application, and represent, in—

Figure 1 a face view of one form which a hemoglobinometer constructed in accordance with my invention, may assume. Fig. 2 a side view of the same. Fig. 3 a view thereof in horizontal section. Fig. 4 a vertical central sectional view of the instrument with the telescope and lamp-holder removed. Fig. 5 a detached reverse plan view of the operating-disk. Fig. 6 a detached perspective view of the blood-specimen holder. Fig. 7 a detached perspective view of the glass blood-specimen receiver. Fig. 8 a broken sectional view, showing a method of positioning the light-filtering and light-diffusing plates. Fig. 9 a detached reverse perspective view of the cover of the housing.

My invention relates to an improved method of, and means for, measuring light and determining the depth of color of objects, the invention being particularly applicable to the measurement of the amount of hemoglobin in blood, though not limited to such use.

The object of my invention, however utilized, is to provide simple and accurate means for measuring light and determining the depth of color of objects.

With these ends in view, my invention consists in a method and apparatus taking advantage of the obstruction which objects offer to the transmission through them of rays of approximately spectroscopically pure color and measuring the amount of such obstruction.

My invention further consists in certain details of method and apparatus as will be hereinafter described and pointed out in the claims.

For the disclosure of my invention I have chosen to illustrate it as embodied in a hemoglobinometer though, as already stated, the invention may be applied to a wide range of uses.

In carrying out my invention as herein shown, I employ two colored glass light-filtering plates 2 and 3, two mirrors 4 and 5, a blood-specimen receiver 6, a movable and preferably colorless porcelain part 7 which, in default of a better term, I shall call a light-diffuser, the said part having two surfaces standing at right angles to each other, a lamp 8 in the form of a small incandescent electric light bulb, and a telescope 9 of any approved form. These several elements are relatively arranged so that two rays of light passing from the lamp through the filtering-plates 2 and 3 will be deflected by the mirrors 4 and 5 upon the respective surfaces of the part 7 which swings upon its apex which is located in line with the axial center of the telescope 9. The ray of light passing through the filtering-plate 3 also passes through a blood-specimen in the receiver 6, whereby a portion of the light is obstructed, so that less light is reflected by the mirror 5 upon the surface 10 of the light-diffuser than is reflected by the mirror 4 upon the surface 11 of the light-diffuser which may be swung upon its apex until its respective surfaces are correspondingly illuminated.

The extent to which the part 7 is swung from its zero position is measured and the amount of obstruction represented by the amount of homoglobin in the blood-specimen thus determined. Preferably the plates 3 and 4 will consist of strips of green glass, though glass of other color may be used, and if desired, colored glass may be replaced by other substances, such, for instance, as celluloid. The said part 7 is mounted in a frame or carrier furnished at its upper and lower ends with trunnions 12 and comprising an upper flange 13, a lower flange 14 and an angular connecting bar 15 over which the angular part is fitted. The said lower flange 14 is toothed to form a segmental rack 16 meshed into by a pinion 17 at the lower end of a shaft 18 furnished at its lower end with a trunnion 19 and at its upper end with a stem 20 for the attachment of an operating disk 21 having an index mark 22 in its beveled edge 23 which latter is located just within a circle 24 of graduations formed upon the circular cover 25 of a circular cup-like housing 26 within which the several parts of my improved instrument are located, barring the telescope 9 and the lamp-holder 27. The said telescope and lamp-holder are, as shown, screwed into the side walls of the housing at opposite points therein. Barring the telescope 9 and lamp-holder 27, the parts of the instrument are mounted between the said cover 25 and a circular plate 28 secured to it in spaced relation by means of pillars 29, the cover 25, plate 28 and pillars 29 corresponding to the two movement plates and pillars of an ordinary watch or clock-movement, and forming, as it were, a cage for the inclusion between them of all the parts except the said telescope 9 and the lamp-holder 27. This cage is positioned in the housing 26 by the provision of the cover 25 with an annular flange 30 fitting within the open edge of the housing and by making the plate 28 of the same diameter as the flange 30 and so as to fit within the bottom of the housing. The trunnions 12, 12, of the frame or carrier are respectively journaled in the cover 25 and plate 28 as shown in Fig. 4 which also shows the bearing of the journal 19 of the shaft 18 in the plate 28 and the bearing of the upper end of the shaft at the point 31 in the cover 25.

The filtering-plates 2 and 3 are backed, as shown, by ground glass diffusing-plates 32 and 33 respectively located between the mirrors 4 and 5 and the lamp 8 which latter is inclosed in a circular screen 34 interposed between the cover 25 and plate 28 and having a clearance opening 35 for the lamp 8 and two light-ports 36 and 37 arranged in line between the lamp 8 and the mirrors 4 and 5 respectively. The said mirrors 4 and 5 are mounted in holders 38 interposed between the cover 25 and plate 28, and secured to the latter, these mirrors being located in line with each other on opposite sides of the movable part 7. As shown, the filtering-plate 2 and the diffusing-plate 32 are held in place by the insertion of their edges into grooves 39 and 40 in the cover 25 and plate 28 respectively, as shown in Fig. 8. The filtering-plate 3 and diffusing-plate 33 will be mounted in the same manner. The blood-specimen to be tested is placed in a shallow recess 41 in a glass-plate 42, and confined in place by a glass-plate 43 in the ordinary manner of making microscopic slides. The said plates 42 and 43 are removably mounted in the blood-specimen receiver 6 which is introduced into an opening 44 in the band portion of the housing 26. The plates 42 and 43 are held in place in the receiver 6 by means of a spring 45 furnished with a circular opening 46 arranged in line with a corresponding opening 47 in the front of the receiver 6 which, it will be understood, is designed to be readily introduced into and removed from the instrument. To prevent the light-diffuser from vibrating and to take up back-lash, its upper trunnion 12 is encircled by a spring 48 the inner end of which is attached to the trunnion and the outer end of which is attached to the adjacent pillar 29.

In using the instrument a measured quantity of pure or diluted blood is placed in the recess 41 in the plate 42, and is sealed therein by the plate 43 after which the receiver 6 is restored to the instrument. Now assuming the lamp 6 to be lighted and the light diffuser 7 to be centrally located or in its zero position with respect to the axial line of the telescope, it will be at once observed through the same that the surface 10 of the light diffuser is darker than the surface 11 thereof. This difference in the amount of light thrown by the mirrors 4 and 5 upon the respective surfaces 11 and 10 of the light-diffuser is due to the fact that the blood specimen obstructs a certain amount of the spectroscopic light filtered through the plate 3, the amount of light obstructed by the blood-specimen varying with the amount of hemoglobin in the specimen. This amount is now measured by turning the disk 21, whereby the part 7 is swung so as to gradually change the position of its surfaces 10 and 11 with respect to the mirrors 4 and 5 until the said surfaces 10 and 11 of the said part 7 appear through the telescope 9 to be equally illuminated. The amount which it has been necessary to swing the part 7 from its zero position to a position in which its faces are equally illuminated may now be read upon the graduations 24 which thus indicate the amount of hemoglobin in the blood. It will be understood, of course, that by swinging the part 7 the amount of light gathered by it from the mirrors is changed owing to the changing of the positions of its respective surfaces with respect to the beams of light reflected from the mirrors.

Although I have shown and described my invention as embodied in a hemoglobinometer, I wish it understood, as already stated, that I do not confine myself to devices for determining the amount of hemoglobin in blood, since my invention is applicable for use in all situations where it is desired to measure the light, and particularly depth of color of an object.

I claim:—

1. A method of determining the depth of color of an object by measuring the amount of obstruction that the object offers to the passage through it of a ray of light of approximately spectroscopically pure color.

2. A method of determining the depth of color of an object by passing a ray of approximately spectroscopically pure color through the object and measuring the differerence between the amount of light so transmitted and the amount of light of a second ray of the same initial color and intensity.

3. A method of determining the depth of color of a transparent colored object, consisting in measuring the amount of obstruction that the object affords to the passage through it of the rays of a limited part of the spectrum, such limitation being effected by the interposition of a colored filter between the source of light and the eye.

4. In an instrument for measuring the depth of color of a transparent colored object, the combination with means for transmitting a ray of light through the object, of means for reducing the said ray of light to approximate spectroscopic purity, a movable surface upon which light so reduced and transmitted is gathered, means for correspondingly reducing another ray of light to approximate spectroscopic purity, a concurrently movable surface upon which the ray of light last mentioned is gathered and means for measuring each movement.

5. In an instrument for measuring the depth of color of a transparent colored object, the combination with means for transmitting two rays of light one of which passes through the object, of means for reducing both rays of light to approximate spectroscopic purity, a light-diffuser having two surfaces upon which the light of the respective rays is gathered, means for moving the said light-diffuser for equalizing the density of the illumination of its respective surfaces, and means for measuring the movement of the light diffuser.

6. In an instrument for measuring the depth of color of a transparent colored object, the combination with means for transmitting two rays of light one of which is passed through the object, means for reducing the rays of light to approximate spectroscopic purity, a light-diffuser having two surfaces upon which the light of the respective rays is gathered, an operating disk connected with the light-diffuser for operating the same, and graduations for measuring the movement of the disk.

7. In an instrument for measuring the depth of color of a transparent colored object, the combination with means for transmitting two rays of light, one of which passes through the object, means for reducing the rays of light to approximate spectroscopic purity, of a light-diffuser having two surfaces upon which the light of the respective rays is gathered, a carrier for the said light-diffuser provided with a segmental rack, an operating-disk, a shaft upon which the same is mounted, a pinion upon the shaft meshing into the said rack, and graduations for measuring the movement of the disk.

8. In an instrument for measuring the depth of color of a transparent colored object, the combination with means for transmitting two rays of light, one of which passes through the object, of means for reducing the light of both rays to approximate spectroscopic purity, a light-diffuser having two surfaces upon which the light of the respective rays is gathered, means for moving the said light-diffuser upon a point central to its respective surfaces, means for measuring the movement of the light-diffuser, and a telescope the axial line of which intersects the pivotal point of the light-diffuser.

9. In an instrument for measuring the depth of color of a transparent colored object, the combination with means for transmitting two rays of light, one of which is passed through the object, means for reducing both rays of light to approximately spetroscopic purity, a light-diffuser having two surfaces arranged at a right angle to each other, mirrors for collecting the light of the respective rays and projecting the same upon the respective surfaces of the light-diffuser, means for moving the light-diffuser to equalize the illumination of the respective surfaces of the same, and means for measuring the movement of the light-diffuser.

10. In an instrument for measuring the depth of color of a transparent colored object, the combination with the source of light, of a light-filtering plate of approximately spectroscopically pure color arranged with respect to the said light to reduce the rays to be examined to approximate spectroscopic purity, a light-diffuser having two surfaces arranged at a right angle to each other, mirrors receiving the respective rays of light and throwing the same upon the respective surfaces of the light-diffuser, means for shifting the light-diffuser to equalize the intensity of the illumination of its respective surfaces, a telescope the axis of which is in line with the pivotal point of the light-diffuser, means for measuring the movement of the light-diffuser, and means for interposing an object the depth of color of which is to be measured in one of the rays of light the proportional obstruction of which is measured.

11. In an instrument for measuring the depth of color of a transparent colored object, the combination with a housing, of a light-diffuser, two mirrors and two filtering plates of approximately spectroscopically pure color located therein, a lamp holder and a telecope mounted in the sides of the housing, and a measuring disk placed upon the outside of the housing and connected with the light-diffuser for operating the same.

12. In an instrument for measuring the depth of color of a transparent colored object, the combination with a housing, of a light-diffuser, two mirrors and two filtering plates of approximately spectroscopically pure color located therein, a lamp holder and a telescope removably mounted in the housing, and a measuring disk placed upon the outside of the housing and connected with the light-diffuser for operating the same.

13. In an instrument for measuring the amount of hemoglobin in blood, the combination with a housing, having a cup-like body and a removable cover, of a plate connected with the cover by pillars and fitting within a cup-like housing, a pivotal light-diffuser having two surfaces located at a right angle journaled between the said cover and plate, two mirrors located between the cover and plate in position to reflect the light collected by them upon the respective surfaces of the light-diffuser, two filtering plates of approximately spectroscopically pure color located between the cover and plate, a lamp adapted to be introduced between the cover and plate, a blood-specimen holder adapted to be introduced between the cover and plate in the path of one of the rays of light transmitted by the lamp through one of the filtering-plates, a removable lamp-holder mounted in the cup-like body of the housing, and a telescope mounted in the said body of the housing with its axial line intersecting the pivotal point of the light-diffuser.

In testimony whereof, I have signed this specification in the presence of two subscribing witnesses.

JAMES L. WHITNEY.

Witnesses:
CLARA L. WEED,
GEO. D. SEYMOUR.